United States Patent [19]

Morin, Jr. et al.

[11] Patent Number: 4,899,161

[45] Date of Patent: Feb. 6, 1990

[54] HIGH ACCURACY COORDINATE CONVERSION METHOD FOR AIR TRAFFIC CONTROL APPLICATIONS

[75] Inventors: Wilfred W. Morin, Jr., Sea Isle City, N.J.; Barry Wasser, Potomac, Md.

[73] Assignee: International Business Machines Corporation, Armonk, N.Y.

[21] Appl. No.: 222,588

[22] Filed: Jul. 21, 1988

[51] Int. Cl.$^4$ .................. G01S 3/02; G01S 13/00; G01C 15/20; G06K 15/00

[52] U.S. Cl. .................. 342/451; 342/180; 342/456; 364/460; 364/514

[58] Field of Search .............. 342/176, 178, 180, 450, 342/451, 456; 364/514, 516, 439, 456, 459, 731, 460, 461

[56] References Cited

U.S. PATENT DOCUMENTS 3,925,750 12/1975 Gilbert et al.
3,971,025 7/1976 Levine
3,996,590 12/1976 Hammack
4,023,158 5/1977 Corcoran
4,196,474 4/1980 Buchanan et al.

OTHER PUBLICATIONS

D. Goldenberg et al., "A Common Coordinate System for the Utilization of Data . . . ", MIT Lincoln Lab. Tech. Report #67, 9/54.

Primary Examiner—Thomas H. Tarcza
Assistant Examiner—Gregory C. Issing
Attorney, Agent, or Firm—John E. Hoel

[57] ABSTRACT

A computer method is disclosed for accurately transforming multiple radar observations of aircraft into a common coordinate system for air traffic control applications. The method involves a transformation from radar observables of the target slant range, azimuth and altitude to the target position coordinates in a stereographic system plane for display. The method includes a conformal coordinate conversion process from geodetic to conformal spherical coordinates followed by a conformal stereographic projection process onto a system display plane. The resulting display of aircraft position on the system plane is more accurate than has been available in the prior art.

4 Claims, 7 Drawing Sheets

HIGH ACCURACY COORDINATE CONVERSION METHOD FOR AIR TRAFFIC CONTROL APPLICATIONS

The Government has rights in this invention pursuant to Contract No. DTFA01-84-C-00039 awarded by the Federal Aviation Administration.

FIELD OF THE INVENTION

The invention disclosed broadly relates to data processing systems and methods and, more particularly, relates to an improved method for accurate coordinate conversion for air traffic control applications.

BACKGROUND OF THE INVENTION

Air traffic control is the process of using radar and other electronic detection techniques to locate and track aircraft flying through the airspace, to monitor assigned positions, coordinate courses to prevent intersection collisions and near-misses, and to advise on course corrections to avoid collisions, adverse weather conditions, and for other reasons. Typically, an air traffic control system includes a plurality of radar sites at diverse geographic locations, which monitor the air traffic and report detected positions of the aircraft to centralized data processing system for the preparation of an integrated display to an air traffic controller who is a person who can make observations, judgements and recommendations concerning the airplanes identified and displayed at a display station. Each radar station can measure the slant range which is the radius vector distance between the radar station and the aircraft, and the azimuth, which is the angle which a vertical plane makes with the Earth, containing the aircraft, the radar station and the center of the Earth, with respect to true north. The aircraft is typically required to transmit its measured altitude above the surface of the Earth, this usually being done by a barometric pressure sensing device on board the aircraft, which is coupled with a transponder, which transmits the measured altitude of the aircraft to the radar station or other receiving station in the air traffic control system. This data is then processed and integrated with aircraft detection data from other radar stations at a central data processing site for display on a display screen to the air traffic controller.

Studies have been made in the past on a common coordinate system for the processing of aircraft in-flight detection data, using several radar stations. One study has been published by Daniel Goldenberg and Eric Wolf, "A Common Coordinate System for the Utilization of Data From Several Radars," *MIT Lincoln Laboratory Technical Report*, No. 67, Sept. 1954. In the Goldenberg and Wolf publication, a discussion is given of various cartographic methods for projection of the Earth onto a plane, such as is required for the representation of the location of aircraft detected by a radar onto a flat screen for display to the air traffic controller. The publication discusses four methods for projecting a spherical approximation of the surface of the Earth onto a plane, the Lambert conformal conic, the gnomonic, the stereographic, and the oblique Mercator.

Air traffic control systems include a controller at a ground-based monitoring station watching a cathode ray tube display of the radar reflection which depicts the course and speed of an aircraft being monitored. An expert controller watching this display can advise the pilot whether the aircraft is on a collision course with other aircraft or is deviating from an assigned flight path. Although many of the manual tasks historically required in air traffic control can be eliminated by automatic data processing systems, it is desirable to keep a human controller "in the loop" to apply human judgement and backup support in the surveillance and control of air traffic. This requires the display of the air traffic on a suitable flat screen display. Since the air traffic is occurring in the airspace above the Earth's surface, which is not a planar surface, some transformation is necessary between the detected position of the aircraft and the planar display of the position of that aircraft on the cathode ray tube display for the ground-based controller. In addition, to the extent that automatic data processing systems are applied to compute collision paths for initiating alarms for the benefit of the controller, data must be input to the automatic data processing system either from the original coordinate system for the measurements of the aircraft position or alternately, from the planar coordinate system used for displaying the position of the aircraft.

The representation of features on the surface of the Earth and of the position of aircraft in the airspace above the surface of the Earth, onto a planar display surface, is the subject matter of cartography. Cartography addresses the problem of representing the surface of the Earth on a planar surface. The Earth does not have a perfectly spherical shape, but instead, because it spins about its polar axis, the Earth is an oblate ellipsoid, that is, an ellipse of rotation with an axis through the minor diameter of the ellipse. Thus, the equatorial radius along the major diameter of the oblate ellipsoid, is 3,443.9 nautical miles, whereas the polar radius along the minor diameter of the oblate ellipsoid, is 3,432.4 nautical miles. This difference of 11.5 nautical miles between the equatorial radius and the polar radius of the oblate ellipsoidal Earth, is normally assumed to be negligible in cartography for the purposes of air traffic control transformations of aircraft positions into a planar display surface. In the past, it has been the practice to assume that the Earth's shape is that of a perfect sphere with a radius having an intermediate value between the equatorial radius and the polar radius for the oblate ellipsoid. For example, the North American Datum of 1983, has an equatorial radius of 3,443.918 nautical miles and a polar radius of 3,432.372 nautical miles and provides a mean radius which is one-third of the quantity of the sum of the polar radius plus twice the equatorial radius of 3,440.069 nautical miles. Thus, historically, for transformations from the coordinate system for the measurement of the location of aircraft into a planar display surface, a spherical surface has been assumed with a radius, for example, equal to the mean radius of the oblate ellipsoid.

In performing the transformation from the spherical coordinate system assumed for the Earth's surface and the planar coordinate system for display, it is important to maintain all angles equal during the transformation. Cartographers perform a chart projection for representing all or part of the surface of the ellipsoid upon a planar surface. Cartographers have found that the problem of representing the surface of the ellipsoid on a plane surface is that the ellipsoidal surface is undevelopable, that is, no part of it can be flattened without distortion. Thus, cartographers transfer points from the surface of the ellipsoid onto a plane or other developable surface which can be flattened to form a plane, such as a cylinder or a cone. If points on the surface of the ellipsoid are projected from a single point, the projection is said to be perspective or geometric. This would also include projection of parallel rays from infinity. Chart projections are usually classified as to the type of developable surface onto which the spherical or ellipsoidal surface is transferred. The primary types are cylindrical projections, conical projections, and azimuthal projections. An important property of a map projection for the purposes of air traffic control is to maintain correct angular relationships. A projection with this characteristic is said to be conformal. The Mercator Projection is a conic projection upon a plane, the cylinder being tangent along the equator. The Mercator projection has the desirable property of being a conformal projection since expansion is the same in all directions, and angles are thus correctly shown. Another conformal projection is the Lambert Conformal Projection, which is a simple conic projection, where the cone intersects the Earth at two standard parallels, and the spacing of the parallels is altered so that the distortion is the same along them as along the meridians. The Lambert Conformal Projection thus maintains angles in the transformation and is widely used for navigation. In azimuthal projections, points on the Earth are projected directly on to a planar surface. If the plane is tangent at some point on the surface of the Earth, and points are projected geometrically from the center of the Earth, the result is a gnomonic projection, which has the property that any great circle appears on the map as a straight line, but which does not transform angles uniformly, and therefore, is not a conformal transformation. However, a stereographic projection is an azimuthal projection where points on the surface of the Earth are projected geometrically onto a tangent plane, from a point on the surface of the Earth opposite of the point of tangency. The stereographic projection is a conformal transformation where all angles are uniformly maintained during the transformation. The scale of the stereographic projection increases with distance from the point of tangency, but more slowly than in the gnomonic projection, and an entire hemisphere can be shown without excessive distortion.

The transformation of aircraft position information from multiple radar stations into a common coordinate system was first discussed by D. Goldenberg and E. W. Wolf, in their above referenced paper. A version of the method suggested by Goldenberg and Wolf, is currently employed by the Federal Aviaation Administration of the United States of America, for air traffic control applications in the FAA National Air Space system (NAS) and is described in the FAA Document "Multiple Radar Data Processing," NAS-MD-320, Jan. 1, 1984. The NAS method consists of two stages. In the first stage, a single radar station's observations of an aircraft target, are converted into a local stereographic plane, having a point of tangency with an assumed spherical Earth at the location of the radar station. Next, the location within this plane of the measured coordinates for the target, is transformed into a system stereographic plane. In each of these two steps, approximations are made which result in a final performance measurement accuracy of approximately 0.4 nautical miles for a square area in the system plane no greater than 350 nautical miles on a side.

Figure 1:
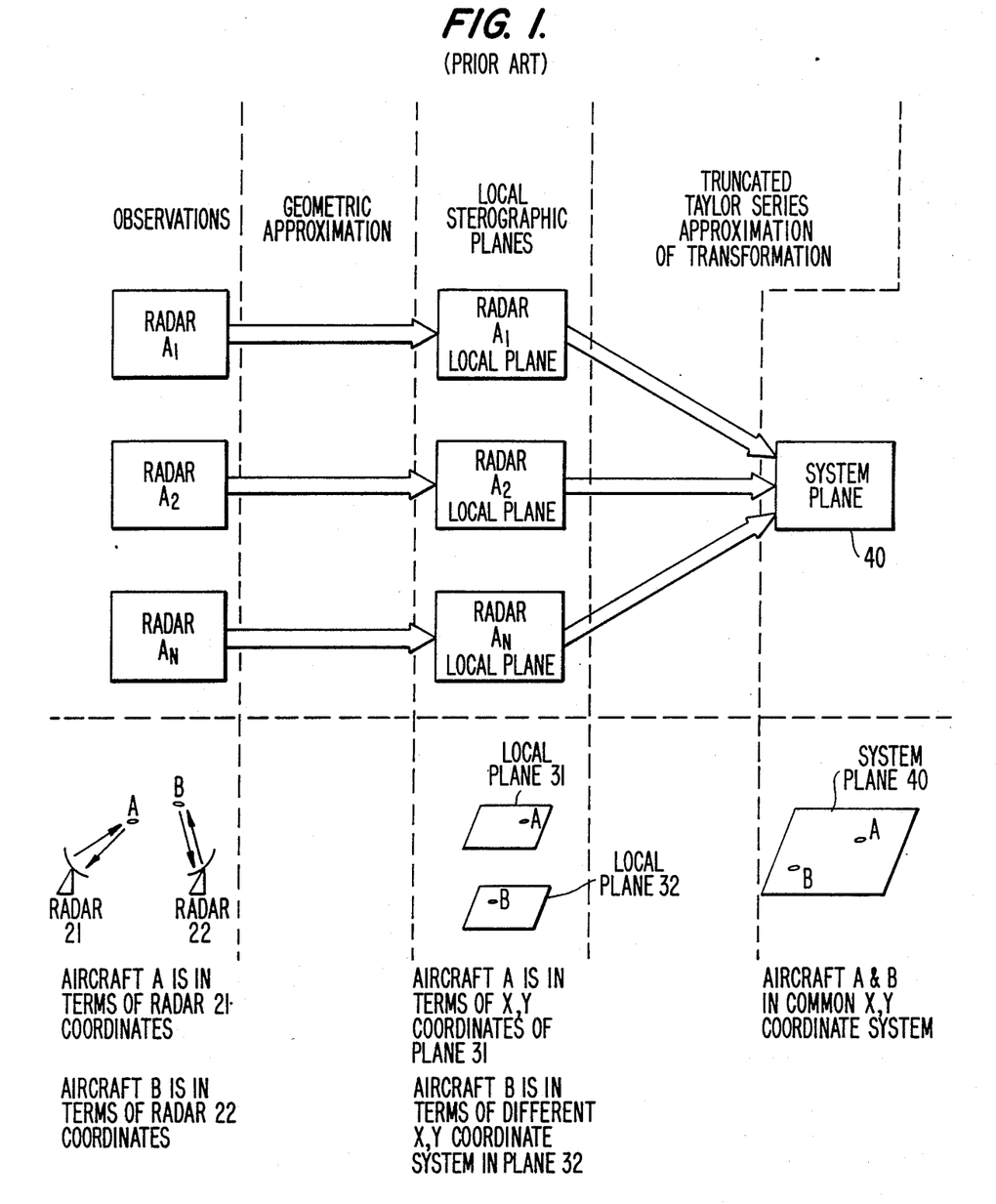
FIG. 1 is a diagram of the prior art technique for the transformation of air traffic control information from multiple radar observations into a common system plane.

FIG. 1 presents the present air traffic control National Air Space system (NAS) coordinate conversion processing method in schematic form. FIG. 1 shows the system of a plurality of radar stations which observe aircraft and have the aircraft measurement data reduced to a common coordinate system. In the column headed "Observations," in FIG. 1, a plurality of N radar stations are at locations separated by from a few nautical miles to hundreds of nautical miles. At the bottom of the column entitled "Observations," is an example of a simple case where a first radar station 21 is observing aircraft A, and a second radar station 22 is observing aircraft B. The resulting measurement data are slant range and azimuthal angular offset from the radar local north direction and the aircraft altitude, as reported by the aircraft itself. The second column in FIG. 1 labeled "Geometric Approximation", represents a geometric approximation which is employed to project the images of the aircraft onto local two-dimensional planar surfaces, each of which is tangent to the Earth's assumed spherical surface at the respective radar sites. This is represented in the third column of FIG. 1, labeled "Local Stereographic Planes." The respective radar sites shown in the third column on FIG. 1 represent the stereographic mappings of the respective target images. These two associated planes are the "local" stereographic planes. At the bottom of the third column entitled "Local Stereographic Planes," the image of aircraft A is projected onto the local radar 21's local stereographic plane 31 and the image of the aircraft B is projected onto the second radar 22's local stereographic plane 32, respectively. The final step in the present NAS method is represented in the fourth column, entitled "Truncated Taylor Series Approximation of Transformation," wherein the method transforms the location of the aircraft in the N plurality of local stereographic planes 31 and 32, into a single plane coordinate system 40 as represented in the far right column in FIG. 1. The transformation into the system plane 40 is also a stereographic transformation. The system plane is used for air traffic control display purposes and for processing of subsequent functions such as automic heading computations for collision alarm, for example. The transformation of plurality of N local stereographic planes 31 and 32, into a single system plane 40 is performed by a truncation after the second term of a Taylor series expansion of the mapping function for a stereographic projection. Truncation after the second term of a Taylor series expansion introduces still another approximation in the final coordinate system representation of the multiple sensor and aircraft configuration. This, in addition to ignoring the oblate ellipsoidal shape of the Earth, introduces the poor accuracy of 0.4 nautical miles in the current NAS system.

OBJECTS OF THE INVENTION

It is therefore an object of the invention to provide an improved air traffic control system.

It is another object of the invention to provide an improved air traffic control system, which more accurately represents the location of aircraft than has been available in the prior art.

It is another object of the invention to provide improved air traffic control system which enables a plurality of radar sites to detect the position of aircraft and to have those positions represented more accurately than has been available in the prior art.

It is yet a further object of the invention to provide an improved method for the transformation of multiple radar observations into a common coordinate system, for air traffic control applications, which is more accurate than has been available in the prior art.

SUMMARY OF THE INVENTION

These and other objects, features and advantages are accomplished by invention disclosed herein.

A computer method is disclosed for accurately transforming multiple radar observations of aircraft into a common coordinate system for air traffic control applications. The method involves a transformation from radar observables of the target slant range, azimuth and altitude, to the target position coordinates in a stereographic system plane for display. The method includes a conformal coordinate conversion process from geodetic to conformal spherical coordinates followed by a conformal stereographic projection process onto a system display plane. The resulting display of aircraft position on the system plane is more accurate than has been available in the prior art.

The invention is employed in an air traffic control system, including a plurality of radar stations, located on the surface of the Earth, operatively connected to a data processing system, for displaying the location of targets detected by the radar stations. The method includes the step of receiving the slant range, azimuth and altitude measurements of a target at a first one of the radar stations, computing the geodetic latitude and longitude of the target in an ellipsoidal reference system, computing the conformal latitude and longitude of the target in a conformal spherical reference system, and projecting the conformal latitude and longitude of the target from the conformal spherical reference system to a system plane by means of a stereographic projection. In this manner, target positions are depicted accurately and all angles are preserved.

After having determined the geodetic latitude and longitude for all targets in the system, a transformation must be made from the geodetic system of coordinates, which are referenced with respect to an ellipsoid, to a conformal sphere system of coordinates. A conformal sphere is a sphere which has the property that all angles are preserved in the transformation. This means that a heading for a target which is referenced with respect to a north-south position, for example, on the geodetic ellipsoidal surface, will also have the same angular heading with respect to the north-south position on the conformal spherical surface. This transformation is made by computing, the conformal latitude of the subtarget point, i.e., the geodetic latitude of the target. The value for the longitude of a target expressed in the ellipsoidal system will be the same as the numerical value when expressed in a concentric spherical system.

After having converted the geodetic latitude of the target to the conformal sphere latitude for the target, a projection must be made onto a planar surface which will, once again, preserve all angles. This is done by a stereographic projection, onto a plane having a point of tangency selected at some location on the surface of the conformal sphere. All points on the conformal surface, which have been depicted by conformal latitude and longitude, are projected onto the tangent plane by means of a ray which emanates from a point on the diametric opposite side of the conformal sphere from the point of tangency for the plane. This tangent plane is referred to as the system plane, and is the plane for display of the target locations with their headings preserved. The theoretical limit of accuracy for the invention is .00008 nautical miles.

DESCRIPTION OF THE FIGURES

These and other objects, features and advantages of the invention will be more fully appreciated with reference to the accompanying figures.

DISCUSSION OF THE PREFERRED EMBODIMENT

As previously mentioned, the shape of the Earth is that of an oblate ellipsoid. Thus, a plane tangent to any point of the surface of the Earth has a normal which passing through the point of tangency does not necessarily pass through the center of the Earth. Hence, although values of longitude for a position on the surface of the Earth do not vary in magnitude between a geocentric approximation of a spherical surface for the Earth and a geodetic longitude for an ellipsoidal Earth, the geocentric latitude for a spherical representation of the Earth does have a different value from the true geodetic latitude. The geodetic latitude is the angle which the normal to the ellipsoid at a station makes with the plane of the geodetic equator, in an ellipsoidal representation of the Earth. Geodetic longitude is the angle between the plane of the geodetic meridian at a station and the plane of the geodetic meridian at Greenwich, for an ellipsoidal representation of the Earth. The geocentric latitude is the angle at the center of the ellipsoid used to represent the Earth, between the plane of its Equator and a straight line radius vector to a point on the surface of the ellipsoid. This differs from the geodetic latitude because the Earth is an ellipsoid rather than a sphere, and the meridians are ellipses. Since the parallels of latitude are considered to be circles, the geodetic longitude is geocentric, and a separate expression is not required. The difference between the geocentric and the geodetic latitudes has a maximum of about 11.6 minutes at a latitude of 45°. Because of the oblate ellipsoidal shape of the Earth, the length of a degree of geodetic latitude is not everywhere the same, increasing from about 59.7 nautical miles at the Equator, to about 60.3 nautical miles at the poles.

Figure 2:
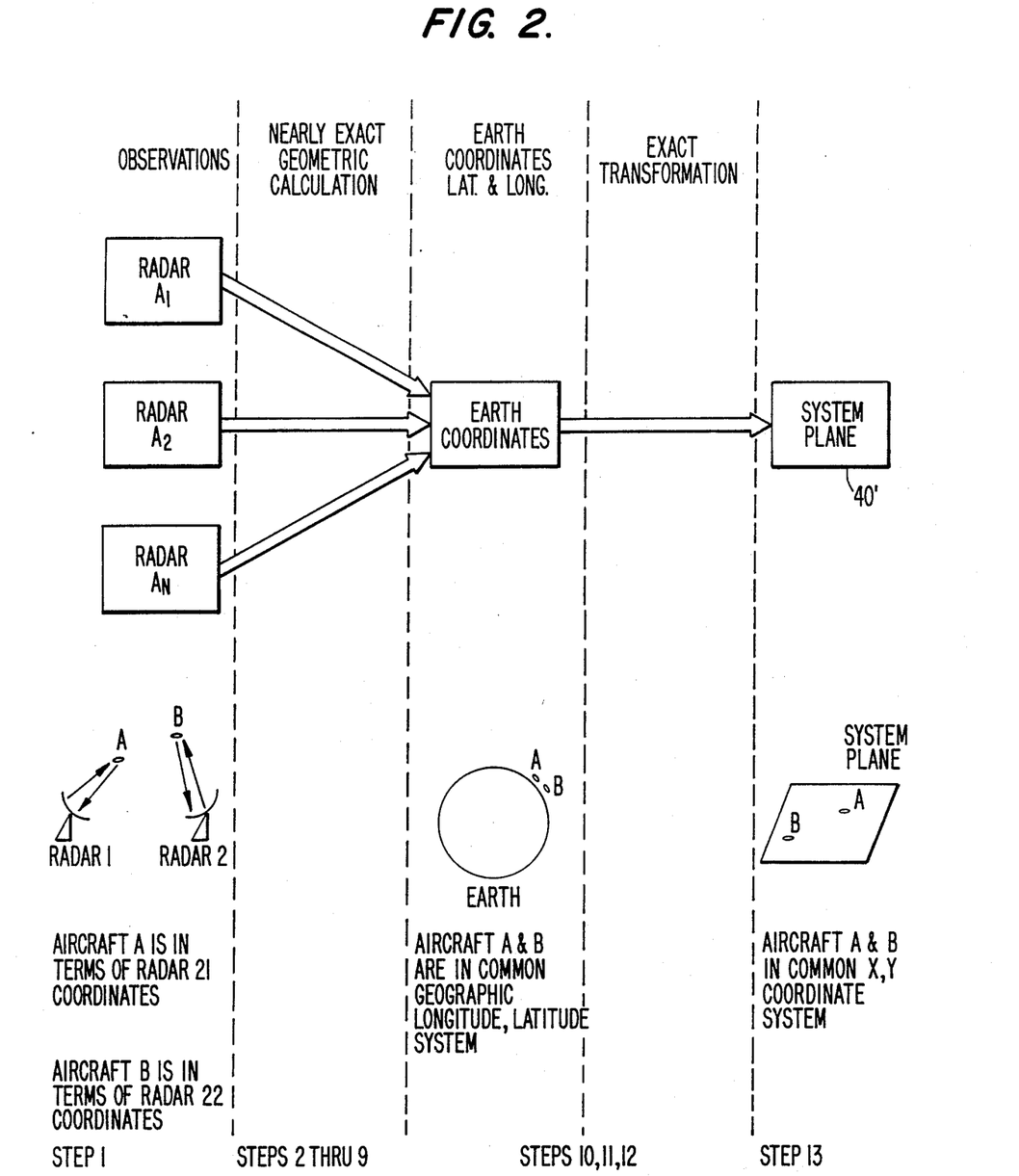
FIG. 2 is a schematic diagram of the method of the invention.
Figure 3:
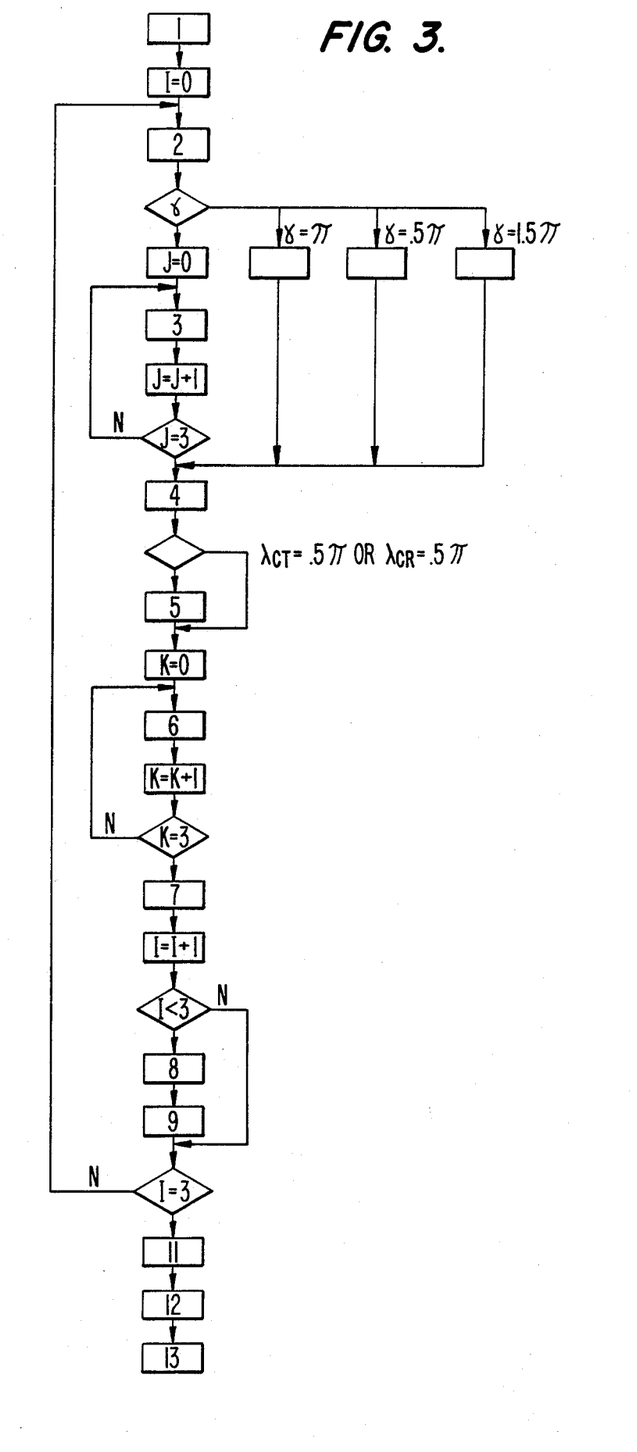
FIG. 3 is a flow diagram of the method of the invention.
Figure 4:
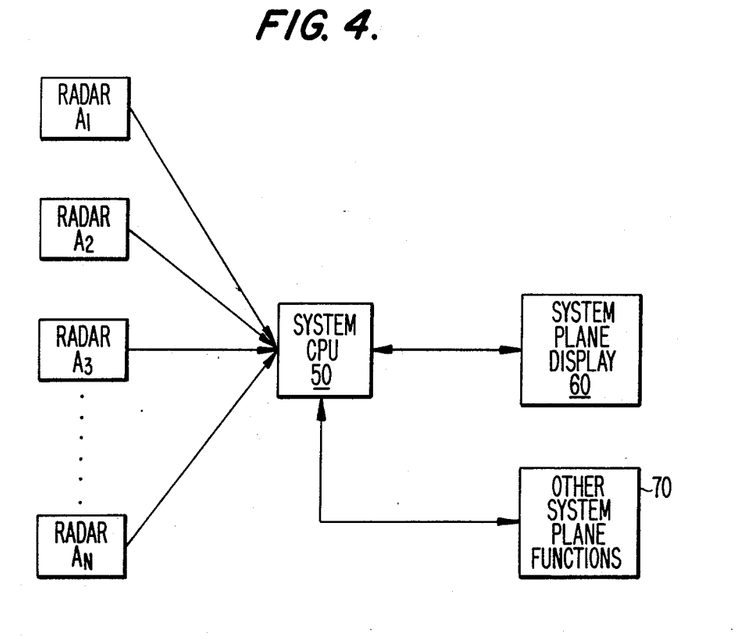
FIG. 4 is a system block diagram of the data processing system for carrying out the method of the invention.

FIG. 2 is a schematic diagram of the method of the invention. Multiple radar observations of aircraft are converted to a single coordinate system in a new transformation technique. In the left-hand column labeled "Observations," a plurality of N radar stations sense aircraft in the air traffic control system. At the bottom of this column is an example of a radar station 21 observing aircraft A and a radar station 22 observing aircraft B. In the next column labeled "Nearly Exact Geometric Calculation," the first eleven steps of the method as shown in FIG. 3, are carried out. The method is carried out in a data processing system such as is shown in the system diagram of FIG. 4, wherein the system central processing unit CPU 50 performs the method steps depicted in FIG. 3. The CPU 50 is a data processor which executes a computer program embodying the flow diagram of FIG. 3. It can accept digital data streams from several radar stations $A_1$, $A_2$, etc., and can perform the method of FIG. 3 to yield the system plane coordinates x and y for many aircraft detected by the radar stations. The output values of x and y from the CPU 50 are then displayed on the flat, cathode ray tube (CRT) display 60 for viewing by the air traffic controller. The method of FIG. 3 has its first eleven steps transforming the radar measurements of the aircraft into worldwide geographic (geodetic) latitude and longitude coordinates in an iterative procedure making use of nearly exact geometric construction. A transformed system is indicated in the third column of FIG. 2, labeled "Earth Coordinates Latitude and Longitude." The method's output at this point is an improvement over the prior art transformation techniques, because the worldwide geographic coordinates for the aircraft are directly calculated for an ellipsoidal shaped Earth. The last two columns of FIG. 2 labeled "Exact Transformation" represent the remainder of the steps 12 and 13 of the method of FIG. 3. The final transformation is exact and converts the geographic latitude and longitude of the aircraft to coordinates on a common stereographic system plane 40' used by the air traffic controller. The location of the detached aircraft in the system plane 40' is displayed on the system plane display 60. Other functions such as the computation of collision paths, which use the coordinates of the detected aircraft in the common stereographic system plane 40', can be carried out in the CPU 50 or in an attached processor unit 70, as shown in FIG. 4. By using the computer method in accordance with the invention, more air traffic control information is produced and the quality and accuracy of the information is better than that which has been available in prior art systems.

In accordance with the invention, the transformation from radar observables of the target slant range, azimuth, and altitude, to target position coordinates in the stereographic display system plane, requires a coordinate conversion process followed by a stereographic projection process. The measured target azimuth is converted to geocentric azimuth (as if the radar's axis were cited along the geocentric vertical), solving for target geocentric latitude and longitude. This geocentric latitude and longitude are then converted to geodetic coordinates. Then the geodetic coordinates of the target position are transformed to the conformal sphere. Finally the target position from the conformal sphere is projected onto the stereographic display system plane. This iterative technique is necessary because the Earth centered radial distance to the target is initially unknown.

The method for performing the transformation in a data processing system, in accordance with the invention, is described in the flow diagram of FIG. 3. The details of each step in the flow diagram of FIG. 3, are given in the Table II, and an explanation of the terms in Table II is provided in Table I.

Two commonly used terms and their definitions are that of "radial distance," which is the distance from the center of the Earth to a point in space, and secondly, the term, "sub-", is a prefix which denotes the geodetic latitude of a point of interest.

The method in accordance with the invention takes the target data for detected aircraft, which is measured relative to a fixed radar station's location, and calculates the coordinates for the detected aircraft in a stereographic plane, which is a two-dimensional representation of the original three-dimensional configuration for the aircraft flying above the surface of the Earth. The method of the invention is executed in a computer system such as that shown in FIG. 4, as an iterative procedure. In performing the iterative processing, the iterative steps are steps 2 through step 9, inclusive, in Table II. The geocentric coordinates of the aircraft, the geocentric coordinates of the subtarget point, that is, the geodetic latitude of the target, and the geodetic coordinates of the target are calculated. The geodetic coordinates of the target and the subtarget point are the same. The required output of the iteration which is required to continue the method, namely steps 11 through 13, uses only the geodetic coordinates of the target. The geodetic coordinates in the final steps are converted to coordinates on a conformal sphere and then the coordinates on the conformal sphere are transformed to the two-dimensional coordinates of a stereographic plane.

Figure 5:
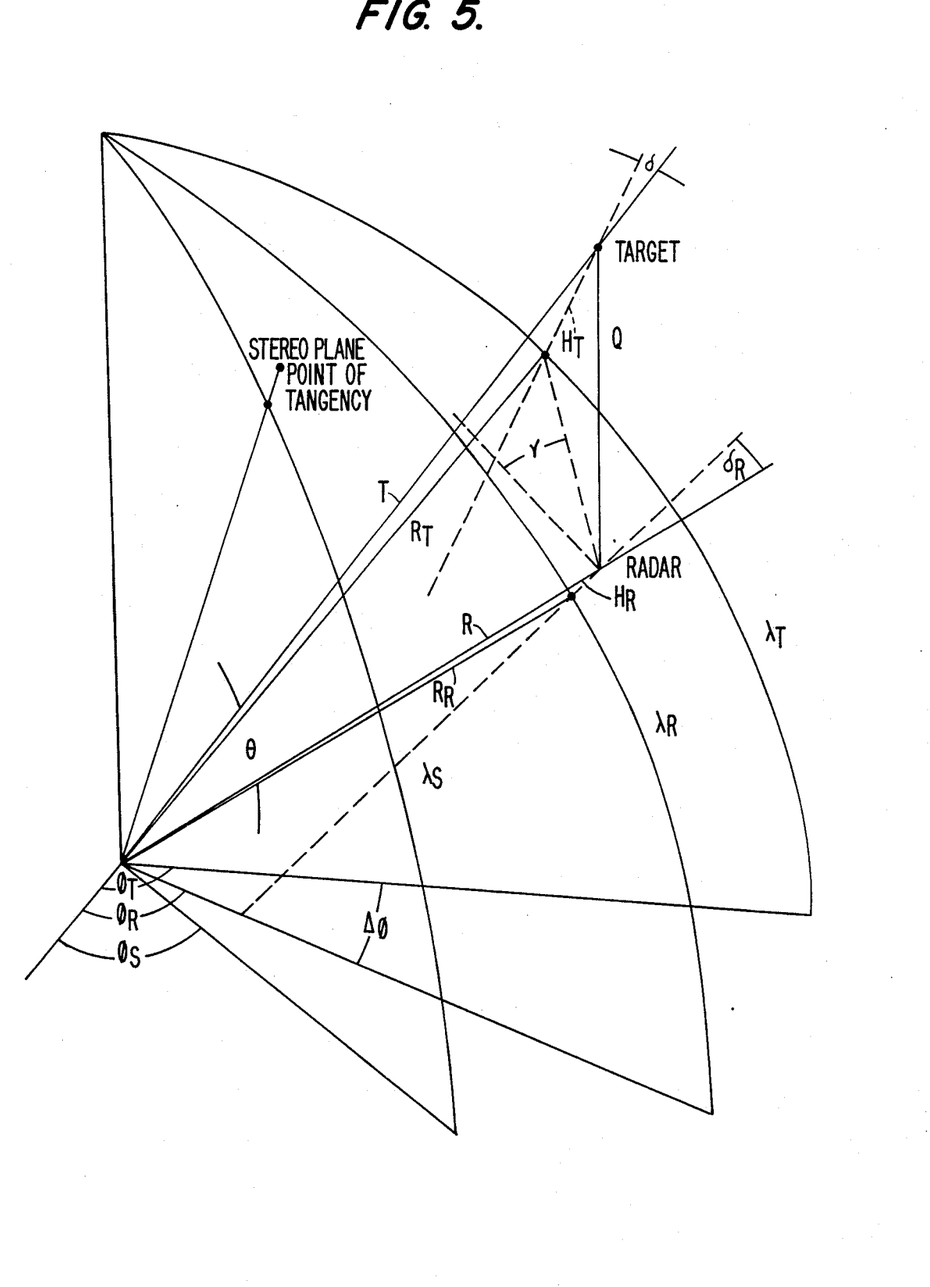
FIG. 5 is a three-dimensional diagram illustrating the geometric aspects of the stereographic projection in accordance with the invention.
Figure 10:
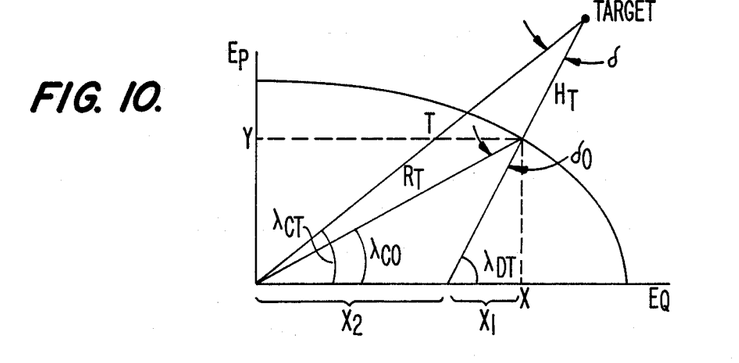
FIG. 10 illustrates the deviation from the normal for the configuration of the cross-section of the Earth's ellipsoid and the target.

In step 1, the method begins with the assignment of estimates of parameters required in the iterative steps 2 through 9. FIG. 5 and FIG. 10 present the geometry to derive the relationships. Equation 1 approximates the subtarget radial distance by the subradar radial distance, and Equation 2 approximates the target radial distance by the sum of the subtarget radial distance and the target altitude. Equation 3 converts the radar measurements into units that can be operated upon, namely radians.

Figure 7:
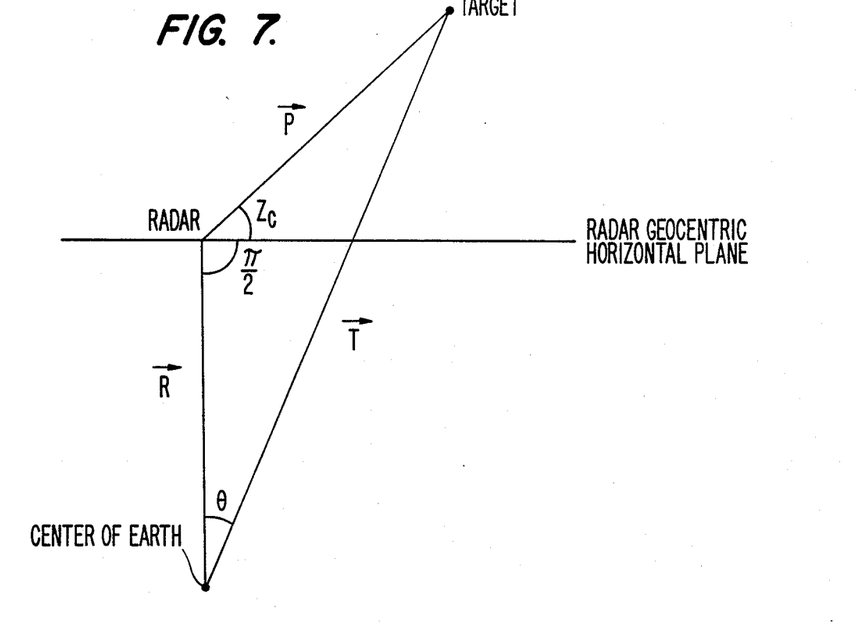
FIG. 7 illustrates the angular relationship between the target and the radar vectors.

In step 2A, the angular separation is calculated between the line from the Earth's center to the target and from the Earth's center to the radar. FIGS. 5 and 7 describe the equations in this step. Equation 4 saves computation by calculating the interim value "A" which is used more than once. Equation 5 is the result of the Law of Cosines, used on the triangle in FIG. 7. Equation 6 yields the angle of interest.

Step 2B provides the elevation angle of the target above the plane tangent to a sphere having a radius equal to the radar radial distance. Refer to FIG. 7. Equation 7 is derived from the Law of Sines applied to the triangle in FIG. 7. Equation 8 is the angle of interest calculated from the arcsine of the quantity calculated in Equation 7.

Figure 8:
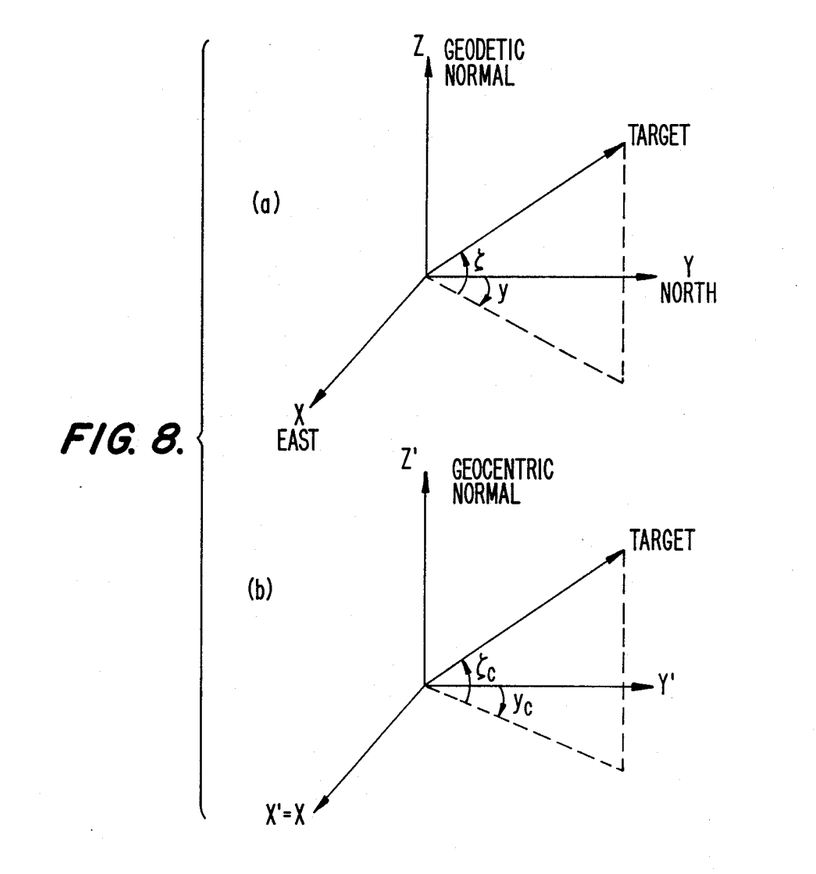
FIG. 8 illustrates radar coordinate system rotation.

Step 3 converts the radar azimuth from the geographic coordinate system to the geocentric system. This is necessary in order to get all of the parameters expressed in one coordinate system. FIG. 8 and Table III illustrate the coordinate rotation which transforms the azimuth from the radar's coordinate system (that is, the geodetic or geographic) to the geocentric coordinate system. Equations 9, 10 and 11 describe the processing for the special cases where the geodetic azimuth is 90°, 180° or 270°, respectively.

Steps 3A and 3B calculate the geocentric azimuth in another iterative procedure. Equation 12 approximates the geocentric azimuth by the geodetic azimuth. Equation 13 solves for the geocentric azimuth, more exactly than does Equation 12.

Step 3C corrects the calcuated geocentric azimuth for ambiguity, which arises since the arctangent of an argument has multiple solutions.

Figure 9:
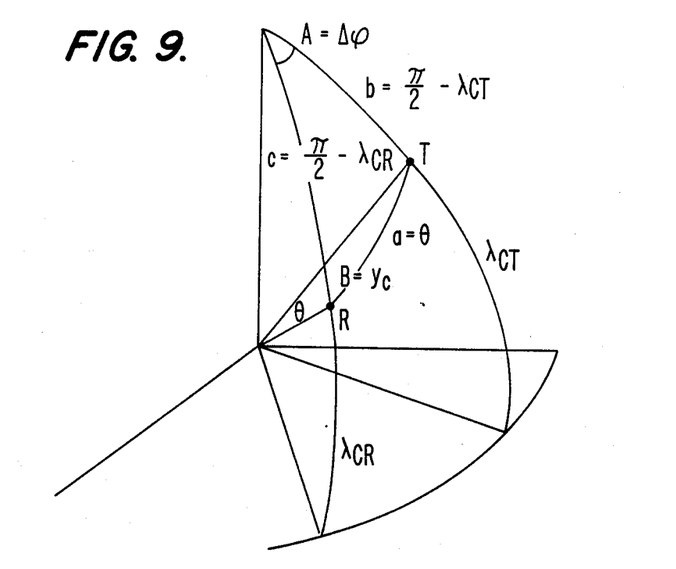
FIG. 9 illustrates spherical triangle identities.

Step 4 calculates the geocentric latitude of the aircraft because by using relationships of spherical triangles, the geocentric latitude of the aircraft can be calculated. See FIG. 9 and Table IV for a description of this calculation. Equation 14 is the Fortran encoded version of the last equation calculation in Table IV. Equation 15 yields the geocentric latitude of the aircraft by taking the arcsine of the result of Equation 14. Equation 16 calculates the cosine of the target geocentric latitude which is to be used later.

Step 5A and 5B is used to find the difference in the longitudes of the radar and of the aircraft, where the direction westward from Greenwich is taken as a positive value. Equation 17 assumes the value in the special cases where either the radar or the aircraft are above the true North Pole. Equation 18 also comes from FIG. 9. It is derived in the first three Equations in Table IV. The quantity evaluated is the cosine of the longitude difference described above. Equation 19 calculates the longitude difference from the result of Equation 18. Equation 20 corrects the result of Equation 19 for multiple solutions.

Step 6 calculates the difference between the geodetic and the geocentric latitudes of the target. It is depicted in FIG. 10 and in Table V.

Step 6A initializes the value of the latitude difference by setting it equal to the latitude difference at the radar station. Equation 21 performs that approximation.

Step 6B is another iterative process to obtain a more accurate value of the latitude difference. Equation 22 calculates the value used multiple times. This saves some computation. Equation 23 calculates the tangent of the difference of the geocentric latitude and the geodetic latitude of the aircraft. Equation 24 calculates the difference by taking the arctangent of the result of Equation 23.

Step 7 calculates the quantity of interest in the main iterative loop, that is the geodetic latitude of the aircraft (and the subtarget point), as can be seen in FIG. 10.

Step 8 calculates more parameters which will be necessary to obtain a more accurate estimate of the target geodetic latitude in subsequent iterations of steps 2 through 9. See FIG. 10 for these quantities. Equation 26 calculates the difference between the geocentric latitude and the geodetic latitude of the subtarget point. Equation 27 then calculates the geocentric latitude of the subtarget point.

Figure 11:
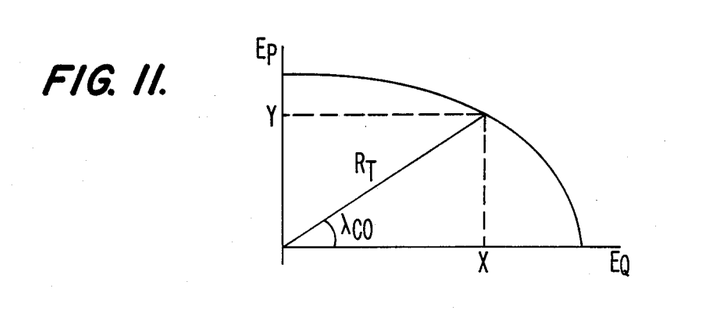
FIG. 11 illustrates the radial distance to the ellipsoid surface for a geocentric latitude.

Step 9 calculates more parameters to be used in subsequent iterations of steps 2 through 9. See FIG. 11. Equation 28 calculates the radial distance to the subtarget point. Equation 29 calculates the radial distance to the target more accurately with each iteration.

Step 11 has Equation 30 calculate the longitude of the target from the known radar longitude and the longitude difference calculated in Step 5B.

At this stage, the geodetic latitude and longitude of the target aircraft is established. This information is sufficient for the comparison of all aircraft positions and headings for the entire air traffic control system. However, in order to provide for the display of all target positions and headings on a flat display in a conformal manner, so as to preserve all angles, steps 12 and 13 must be carried out.

Step 12 now projects the geodetic latitude of the aircraft onto the conformal sphere. The property of the conformal projection is that angles measured on the surface of the Earth are preserved on the conformal sphere. Equations 31 and 32 calculate parameters to be used in Equation 33. Equation 33 produces the conformal latitude of the aircraft.

Step 13 transforms points on the conformal sphere into the two-dimensional stereographic plane for display. The inputs are the aircraft conformal latitude, the aircraft longitude, the conformal latitude of the point at which the stereographic plane is tangent to the conformal sphere, the longitude of this point, and the radius of the conformal sphere. Equations 34 through 37 produce parameters which are used to calculate the coordinates in the stereographic plane. Equation 38 calculates the x coordinate of the aircraft in the stereographic plane, and Equation 39 calculates the y coordinate in the stereographic plane.

The resulting x and y coordinates are then available for the display with the position and headings, of all of the aircraft in the air traffic control system. Still further, computations can be made on these x and y coordinates to determine closing velocities and other functions. The display of the system plane is performed on the system plane display 60 in the system block diagram of FIG. 4. The performance of other system plane functions, such as the computation of closing headings, for example, can be performed by the CPU 50 or alternately by the attached data processor 70 shown in FIG. 4.

Figure 6:
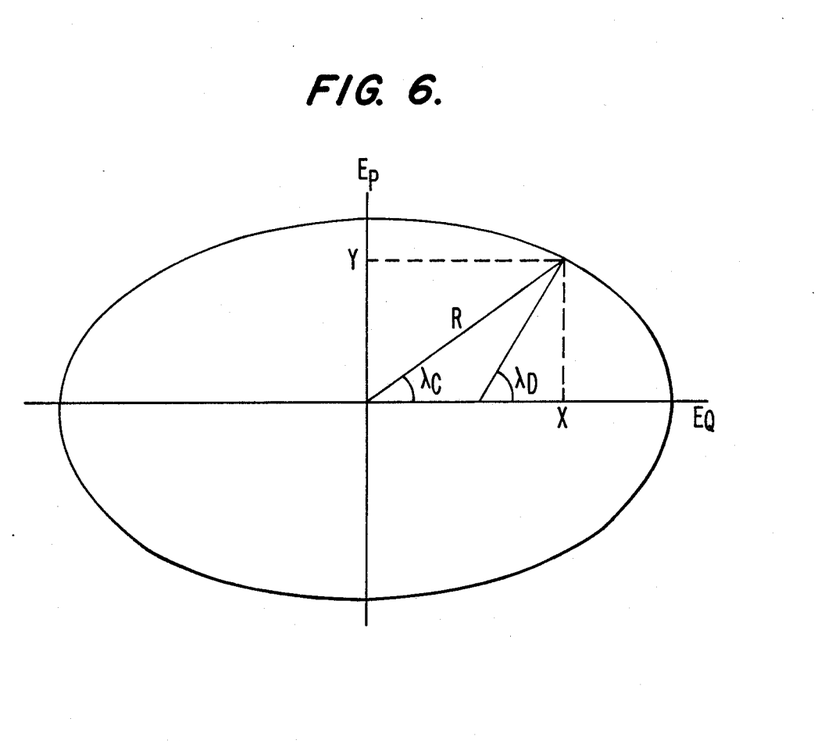
FIG. 6 illustrates a relationship between geodetic and geocentric latitude.

FIG. 6 illustrates the relationship between geodetic and geocentric latitude. It is seen that because of the ellipsoidal surface of the Earth, if latitude is defined as the normal to a plane tangent to the surface of the Earth, the geodetic latitude will be different from the geocentric latitude.

The resulting method provides the display of aircraft altitudes in the stereographic system plane of 10 nautical miles with an accuracy of about 4 to 5 inches.

The resulting transformation method for air traffic control preserves the inherent accuracy in the input target data sufficient to introduce less than 0.005 nautical miles of error in target positions in the stereographic display system plane coordinates.

TABLE I

| | |
|---|---|
| $R$ = | magnitude of the radial vector to the radar (nmi) |
| $R2$ = | 2 times R (nmi) |
| $RR$ = | R squared (nmi$^2$) |
| $R_r$ = | radial distance to the subradar point (nmi) |
| $H_t$ = | height of target above the ellipsoidal surface (nmi) |
| $E_p$ = | earth polar radius (3432.37166 nmi) |
| $slcr$ = | sine of the geocentric latitude of the subradar point (no units) |
| $clcr$ = | cosine of the geocentric latitude of the subradar point (no units) |
| $d_r$ = | deviation from the normal at the subradar point (radians) |
| $tdr$ = | tangent of local deviation from normal at the subradar point (no units) |
| $cdr$ = | cosine of local deviation from normal at the subradar point (no units) |
| $sdr$ = | sine of local deviation from normal at the subradar point (no units) |
| $KK$ = | eccentricity of earth squared (no units) |
| $\rho$ = | slant range from the radar to the target (nmi) |

TABLE I-continued

| | |
|---|---|
| $\rho\dot{\rho} =$ | $\rho$ squared (nmi²) |
| R2R $=$ | R2 times $\rho$, i.e., a constant to calculate the target elevation angle relative to the geocentric system (nmi²) |
| $\gamma_r =$ | radar measured azimuth of the target relative to the geodetic coordinate system (azimuth change pulses) |
| tg $=$ | tangent of the radar measured azimuth (to the target relative to the radar geodetic horizontal, i.e. the plane tangent to the ellipsoid at the radar point) (no units) |
| CON $=$ | the constant $\pi/2098$ for ATCRBS or $\pi/8192$ for Mode-5, used to convert the azimuth change pulse unit of measurement of the radars to radians (radians/azimuth change pulse) |
| $\pi =$ | 3.141592654... |
| $\pi$H $=$ | .5 times $\pi$ |
| $\pi$TH $=$ | 1.5 times $\pi$ |
| $\pi$TW $=$ | 2 times $\pi$ |
| $\lambda_s =$ | geometric latitude of the point of tangency of the stereographic plane (radians) |
| $\pi$Q $=$ | .25 times $\pi$ (no units) |
| SLS $=$ | sine of the geocentric latitude of the point of tangency of the stereographic plane (no units) |
| CLS $=$ | cosine of the geocentric latitude of the point of tangency of the stereographic plane (no units) |
| RC2 $=$ | 2 times RC (n miles) where RC is the radius of the conformal sphere (n miles) |
| $\theta_r =$ | longitude of the subradar point (radians) |
| $\theta_s =$ | longitude of the point of tangency of the stereographic plane (radians) |
| $\lambda_{cr} =$ | geocentric latitude of the subradar point (radians) |

TABLE II

| | Processing |
|---|---|
| Step 1. | Initialize the radial distances to the radar and the target and convert $\gamma_5$ to radians: <br> (1) $R_t = R_r$ <br> (2) $T = R_t + H_t$ <br> (3) $Y = \text{con } Y_r$ |
| Step 2a. | Calculate the angular separation between the vectors from the earth center to the radar and to the target: <br> (4) $A = T^2 - pp$ <br> (5) $ct = \dfrac{A + RR}{R2\,T}$ <br> (6) $\theta = \arccos ct$ |
| Step 2b. | Calculate the elevation angle of the target above the radar geocentric horizontal: |
| (7) | $szc = \dfrac{A - RR}{R2R}$ |
| (8) | $z_c = \arcsin szc$ |
| Step 3. | Calculate the radar azimuth relative to the radar: <br> (9) If $\gamma = \pi$ set $\gamma_c = \pi$ and skip to step 4. <br> (10) If $\gamma = \pi$H set $\gamma_c = \arccos(\tan z_c \, tdr)$ and skip to step 4. <br> (11) If $\gamma = \pi$TH set $\gamma_c = \pi$TW $- \arccos(\tan z_c \, tdr)$ and skip to step 4. |
| Step 3a. | Initialize $\gamma_{cf}$ <br> (12) $\gamma_c = \gamma$ |
| Step 3b. | Repeat this step for three iterations: <br> (13) $\gamma_c = \arctan(tg\,(cdr - \tan z_c \, sdr \, \sec \gamma_c))$ |
| Step 3c. | If $\pi < \gamma < \pi$TW then $\gamma_c = \gamma_c + \pi$ (principle of value in first and second quadrants. |
| Step 4. | Calculate the geocentric latitude of the target: <br> (14) $slct = slcr\,ct + clcr \sin \theta \cos \gamma_c$ <br> (15) $\lambda_{ct} = \arcsin slct$ <br> (16) $clct = \cos \lambda_{ct}$ |
| Step 5a. | Calculate the longitudinal separation of the radar and the target: <br> (17) If $\lambda_{ct} = \pi$H or $\lambda_{cr} = \pi$H then set $\Delta\phi = 0$ and skip to step 6. |
| Step 5b. | (18) $dp = \dfrac{ct - slcr\,slct}{clcr\,clct}$ <br> (19) $\Delta\phi = \arccos dp$ <br> (20) If $\gamma > \pi$ then set $\Delta\phi = -\Delta\phi$ |
| Step 6. | Calculate the deviation from the normal at the target: |
| Step 6a. | Initialize the deviation from the normal at the target: <br> (21) $d = d_r$ |
| Step 6b. | Repeat this step for three iterations: <br> (22) $B = KK\,R_t \cos(\lambda_{ct} + d(1 - T/R_t))$ <br> (23) $td = \dfrac{B\,slct}{T - B\,clct}$ <br> (24) $d = \arctan td$ |
| Step 7. | Calculate the geodetic latitude of the subtarget point: <br> (25) $\lambda_{dt} = \lambda_{ct} + d$ |
| Step 8. | Calculate the geocentric latitude of the subtarget point: |

TABLE II-continued

Processing (26) $d_0 = \arcsin((\sin d) T/R_t)$ (27) $\lambda_{co} = \lambda dt - d_0$ Step 9. Calculate the radial distance to the subtarget point and to the target:

(28) $R_t = \dfrac{E_p}{(1 - K^2 \cos^2 \lambda_{co})^{\frac{1}{2}}}$ (29) $T = R_t + H_t$ Step 10. Repeat steps 2 through 9 for two iterations and steps 2 through 7 of the third iteration.

Step 11. Calculate the longitude of the subtarget point;

(30) $\phi_t = \phi_r + \Delta\phi$

Step 12. Calculate the conformal latitude of the sub-target point:

(31) $KL = K \sin \lambda_{dt}$ (32) $t1 = \left[\dfrac{1 - KL}{1 + KL}\right]^{k/2} \tan(\pi Q + \lambda_{dt}/2)$ (33) $\lambda_c = -\pi Q + 2 \arctan t1$ Step 13. Calculate the X and Y coordinates of the projection of the sub-target point in the stereographic plane:

(34) $SLC = \sin \lambda_c$ (35) $CLC = \cos \lambda_c$ (36) $TEMP = CLC \cos(\phi_s - \phi_t)$ (37) $DE = 1 + SLC\ SLS + TEMP\ CLS$ (38) $X_c = \dfrac{RC2\ CLC \sin(\phi_s - \phi_t)}{DE}$ (39) $Y_c = \dfrac{RC2\ (SLC\ CLS - TEMP\ SLS)}{DE}$

TABLE III

RADAR COORDINATE SYSTEM ROTATION

This appendix calculates the relation between the radar measured azimuth (that is the azimuth on the plane tangent to the earth at the radar position) and the azimuth on the plane tangent to the sphere with radius equal to the distance from the earth center to the radar (that is, the geocentric radar plane). Consider FIG. 8 the radar geodetic coordinate system. Z is the elevation angle and $\gamma$ is the azimuth, both measured relative to the radar geodetic horizontal plane. $z_c$ and $\gamma_c$ are the equivalent quantities in the geocentric system. Now rotate the coordinate system about the x axis by an amount equal to $d_r$ (this is delta sub r in the (figures) the deviation from the normal at the radar position. The resulting matrix equation is:

$$\begin{pmatrix} \rho \cos z_c \sin\gamma_c \\ \rho \cos z_c \cos\gamma_c \\ \rho \sin z_c \end{pmatrix} = \begin{pmatrix} 1 & 0 & 0 \\ 0 & \cos d_r & \sin d_r \\ 0 & -\sin d_r & \cos d_r \end{pmatrix} \begin{pmatrix} \rho \cos z \sin\gamma \\ \rho \cos z \cos\gamma \\ \rho \sin z \end{pmatrix}$$

or
$\rho \cos z_c \sin \gamma_c = \cos z \sin \gamma$
and
$\rho \cos z_c \cos \gamma_c = \rho \cos z \cos \gamma \cos d_r + \rho \sin z \sin d_r$
and
$\rho \cos z_c \cos \gamma_c = \rho \cos z \cos \gamma \cos d_r + \rho \sin z \cos d_r$ From the second and third equations:

$\tan \gamma_c = \dfrac{\sin \gamma}{\cos \gamma_r \cos \gamma + \sin d_r \tan z}$ From the third and fourth equations:

$\tan z = \cos \gamma \left( \dfrac{\tan z_c + \cos \gamma_c \tan d_r}{\cos \gamma_c - \tan z_c \tan d_r} \right)$ Combining the last two equations:

$\tan \gamma_c =$ $$\dfrac{(\tan \gamma (\cos \gamma_c - \tan z_c \tan d_r)}{\cos d_r(\cos \gamma_c - \tan z_c \tan d_r) + \sin d_r (\tan z_c + \cos \gamma_c \tan d_r)}$$

Expanding $\tan d_r$ as $(\sin d_r)/(\cos d_r)$ the last equation reduces to:
$\sin \gamma_c = \tan \gamma(\cos \gamma_c \cos d_r - \tan z_c \sin d_r)$
Now consider the case where $\gamma = \pi/2$. The third, fourth, and fifth equations become, respectively:
$\cos z_c \sin \gamma_c = \cos z$
$\cos z_c \cos \gamma_c = \sin z \sin d_r$
$\sin z_c = \sin z \cos d_r$

TABLE III-continued

RADAR COORDINATE SYSTEM ROTATION

From the last two equations we have:
$\cos \gamma_c = \tan d_r \tan z_c$

TABLE IV

GEOMETRIC RELATIONS OF SPHERICAL TRIANGLES
Using the law of cosines of sides of spherical triangles
(Mathematical Handbook For Scientists And Engineers,
Korn and Korn, 1961, pg. 757)

In any spherical triangle:
$\cos a = \cos b \cos c + \sin b \sin c \cos A$ $\cos \theta = \cos\left(\dfrac{\pi}{2} \cdot \lambda_{CT}\right)\cos\left(\dfrac{\pi}{2} \cdot \lambda_{CR}\right) +$ $\sin\left(\dfrac{\pi}{2} \cdot \lambda_{CT}\right)\sin\left(\dfrac{\pi}{2} \cdot \lambda_{CR}\right)\cos\Delta\phi$ $\cos \Delta\gamma = \dfrac{\cos \theta \cdot \sin \lambda_{CT} \sin \lambda_{CR}}{\cos \lambda_{CT} \cos \lambda_{CR}}$ $\cos b = \cos c\ a + \sin c \sin a \cos B$ $\cos\left(\dfrac{\pi}{2} \cdot \lambda_{CT}\right) =$ $\cos\left(\dfrac{\pi}{2} \cdot \lambda_{CR}\right)\cos\theta + \sin\left(\dfrac{\pi}{2} \cdot \lambda_{CR}\right)\sin\theta\cos\gamma_C$ $\sin \lambda_{CT} = \sin \lambda_{CR} \cos \theta + \cos \lambda_{CR} \sin \theta \cos \gamma_C$

TABLE V

DEVIATION FROM THE NORMAL

FIG. 10 illustrates the configuration of the cross-section of the earth ellipsoid and the target. The following parameters are defined:
$K$ = eccentricity of the earth ellipsoid
$E_p$, $E_q$ = polar and equatorial radii, respectively
$\lambda_{ct}$ = geocentric latitude of the target

TABLE V-continued
DEVIATION FROM THE NORMAL $\lambda_{dt}$ = geodetic latitude of the target (and therefore the sub-target point)
$\lambda_{co}$ = geocentric latitude of the sub-target point
d = deviation from the normal at the target (delta in the figures)
$d_o$ = deviation from the normal at the sub-target point (delta 'sub o' in the figure)
T = distance from the center of the earth to the target
$R_t$ = distance from the center of the earth to the sub-target point
$H_t$ = target altitude above the surface of the earth From the law of sines FIG. 10

$$\frac{\sin d}{x_2} = \frac{\sin d}{K^2 x} = \frac{\sin(\pi - \lambda_{dt})}{T}$$

$\lambda_{co} = \lambda_{dt} - d_o$
$\lambda_{dt} = \lambda_{ct} + d$
$x = R_t \cos \lambda_{co} = R_t \cos (\lambda_{dt} - d_o)$ Combining all the above equations we get $$\sin d = \frac{K^2 R_t}{T} \sin (\lambda_{ct} + d) \cos (\lambda_{ct} + d - d_o)$$

Using the approximation
we have
$\sin d = (R_t/T) \sin d_o$
Furthermore, since the deviation from the normal is less than 0.0034 everywhere, sin d and sin $d_o$ can be approximated by d and $d_o$. Therefore, we get $$\tan d = \frac{K^2 R_t A \sin \lambda_{ct}}{T - K^2 R_t A \cos \lambda_{ct}}$$

where
$A = \cos (\lambda_{ct} + d(1 - T/R_t))$

Evaluation of $x_2$:

1 - $\tan \lambda_{CO} = \frac{y}{x}$ and $\tan \lambda_{DT} = \frac{y}{x_1}$

2 - $\frac{x^2}{E_Q^2} + \frac{y^2}{E_p^2} = 1$

3 - $\tan \lambda_{DT} = \frac{EQ^2}{Ep^2} \tan \lambda_{CO}$

4. $x = x_1 + x_2$
5. $x_2 = K^2 x$

Although a specific embodiment of the invention has been disclosed, it will be understood by those having skill in the art, that changes can be made to the specific embodiment without departing from the spirit and the scope of the invention.

What is claimed is:

1. In an air traffic control system, including a plurality of radar stations, located on the surface of the Earth, operatively connected to a data processing system, a computer method for displaying the location of aircraft detected by said radar stations, comprising the steps of:
   receiving the slant range, azimuth and altitude measurements of an aircraft at a first one of said radar stations;
   computing the geodetic latitude and longitude of said aircraft in an ellipsoidal reference system;
   computing the conformal latitude and longitude of the aircraft in a conformal spherical reference system;
   projecting the conformal latitude and the longitude of said aircraft from said conformal spherical reference system to a system plane by means of a stereographic projection;
   whereby aircraft positions are depicted accurately and all angles are preserved.

2. The method of claim 1, which further comprises: said step of computing the geodetic latitude is an iterative step to obtain a more accurate value for the geodetic latitude of the aircraft.

3. A computer method for transforming multiple radar observations of aircraft into a common coordinate system for air traffic control, comprising the steps of:
   initializing the radial distances to the radar and the aircraft and converting measured azimuth values to radians;
   calculating the angular separation between the vectors from the Earth's center to the radar and to the aircraft;
   calculating the elevation angle of the aircraft above the radar geocentric horizontal;
   calculating the radar azimuth relative to the radar;
   initializing values of measured azimuth;
   calculating the geocentric latitude of the aircraft;
   calculating the longitudinal separation of the radar and the aircraft;
   calculating the deviation from the normal at the aircraft;
   calculating the geodetic latitude of the subtarget point of the aircraft;
   calculating the geocentric latitude of the subtarget point of the aircraft;
   calculating the radial distance to the subtarget point of the aircraft and to the aircraft;
   repeating the steps starting with calculating the angular separation between the vectors from the Earth's center to the radar and to the aircraft down to calculating the radial distance to the subtarget point of the aircraft and to the aircraft for several iterations, and then repeating the step of calculating the angular separation between the vectors from the Earth's center to the radar and to the aircraft through calculating the geodetic latitude of the subtarget point of the aircraft for another iteration;
   calculating the longitude of the subtarget point of the aircraft;
   calculating the conformal latitude of the subtarget point of the aircraft;
   calculating the x and y coordinates of the projection of the subtarget point of the aircraft in the stereographic display system plane;
   displaying the position of the subtarget point of the aircraft at the x and y positions in the stereographic plane.

4. An air traffic control system, including a plurality of radar stations, located on the surface of the Earth, operatively connected to a data processing system, for displaying the location of aircraft detected by said radar stations, comprising:
   means for receiving the slant range, azimuth and altitude measurements of an aircraft at a first one of said radar stations;
   means for computing the geodetic latitude and longitude of said aircraft in an ellipsoidal reference system;
   means for computing the conformal latitude and longitude of the aircraft in a conformal spherical reference system;
   means for projecting the conformal latitude and the longitude of said aircraft from said conformal spherical reference system to a system plane by means of a stereographic projection;
   whereby aircraft positions are depicted accurately and all angles are preserved.

* * * * *